United States Patent
King

(10) Patent No.: US 10,768,955 B1
(45) Date of Patent: *Sep. 8, 2020

(54) EXECUTING COMMANDS WITHIN VIRTUAL MACHINE INSTANCES

(71) Applicant: Amazon Technologies, Inc., Seattle, WA (US)

(72) Inventor: Wesley Gavin King, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,149

(22) Filed: Nov. 1, 2018

Related U.S. Application Data

(63) Continuation of application No. 15/443,697, filed on Feb. 27, 2017, now Pat. No. 10,120,703, which is a
(Continued)

(51) Int. Cl.
*G06F 9/455* (2018.01)
*G06F 9/48* (2006.01)
(Continued)

(52) U.S. Cl.
CPC .......... *G06F 9/455* (2013.01); *G06F 9/45533* (2013.01); *G06F 9/45558* (2013.01);
(Continued)

(58) Field of Classification Search
CPC .. G06F 9/455; G06F 9/45533; G06F 9/45558; G06F 2009/45562;
(Continued)

(56) References Cited

U.S. PATENT DOCUMENTS

| 6,865,679 B1 | 3/2005 | Dennison |
| 7,747,755 B2 | 6/2010 | Manolov |

(Continued)

FOREIGN PATENT DOCUMENTS

| CN | 101410803 | 4/2009 |
| CN | 102047218 | 5/2011 |

(Continued)

OTHER PUBLICATIONS

Amazon, "Amazon Elastic Compute Cloud—API Reference—API Version Feb. 1, 2014", Mar. 30, 2014, pp. i, ii, 1-596, retrieved from the internet at URL:http://web.archive.org/web/20140330143935/http:/awsdocs.s3.amazonaws.com/EC2/latest/ec2-api.pdf on May 30, 2016.

(Continued)

*Primary Examiner* — Charles M Swift
(74) *Attorney, Agent, or Firm* — Lee & Hayes, P.C.

(57) ABSTRACT

Technologies are disclosed herein for executing commands within virtual machine ("VM") instances. A public web service application programming interface ("API") is exposed within a service provider network that includes methods relating to the execution of commands within VM instances. For example, the API might include a method for obtaining a list of the commands that can be executed within a VM instance. The API might also include a method for requesting the execution of a command within a VM instance. The API might also include a method for requesting data describing the status of the execution of a command within a VM instance. The API might also expose other methods. A software agent executing on a VM instance may be utilized to provide a list of commands that can be executed in the VM, to execute requested commands, and to provide data describing the status of execution of a command.

20 Claims, 8 Drawing Sheets

Related U.S. Application Data continuation of application No. 14/664,135, filed on Mar. 20, 2015, now Pat. No. 9,582,298.

(51) Int. Cl.
*G06F 9/50* (2006.01)
*G06F 9/54* (2006.01)

(52) U.S. Cl.
CPC .............. *G06F 9/50* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *G06F 9/5061* (2013.01); *G06F 9/5072* (2013.01); *G06F 9/5077* (2013.01); *G06F 9/5083* (2013.01); *G06F 9/54* (2013.01); *G06F 9/541* (2013.01); *G06F 2009/4557* (2013.01); *G06F 2009/45562* (2013.01); *G06F 2009/45575* (2013.01); *G06F 2009/45583* (2013.01); *G06F 2009/45587* (2013.01); *G06F 2009/45591* (2013.01); *G06F 2009/45595* (2013.01)

(58) Field of Classification Search
CPC ... G06F 2009/4557; G06F 2009/45575; G06F 2009/45587; G06F 2009/45591; G06F 2009/45595; G06F 9/50; G06F 9/5005; G06F 9/5011; G06F 9/5016; G06F 9/5022; G06F 9/5027; G06F 9/5044; G06F 9/5055; G06F 9/5061; G06F 9/5072; G06F 9/5077; G06F 9/5083
See application file for complete search history.

(56) References Cited

U.S. PATENT DOCUMENTS

| | | | |
|---|---|---|---|
| 8,612,971 B1 | 12/2013 | Fitzgerald et al. | |
| 8,949,825 B1 | 2/2015 | Fitzgerald et al. | |
| 2004/0128670 A1 | 7/2004 | Robinson et al. | |
| 2006/0242288 A1 | 10/2006 | Masurkar | |
| 2007/0094367 A1 | 4/2007 | Esfahany et al. | |
| 2007/0283350 A1* | 12/2007 | Anderson | G06F 9/45512 718/100 |
| 2008/0162625 A1* | 7/2008 | Sedayao | H04W 4/00 709/202 |
| 2011/0126193 A1 | 5/2011 | Mullin et al. | |
| 2012/0124151 A1 | 5/2012 | Au | |
| 2012/0174096 A1 | 7/2012 | Conover | |
| 2013/0103777 A1 | 4/2013 | Kagan et al. | |
| 2013/0283263 A1 | 10/2013 | Elemary | |
| 2014/0033200 A1 | 1/2014 | Tompkins | |
| 2015/0012621 A1 | 1/2015 | Patwardhan et al. | |
| 2015/0074659 A1 | 3/2015 | Madsen et al. | |
| 2015/0142942 A1 | 5/2015 | Voruganti et al. | |
| 2015/0154039 A1 | 6/2015 | Zada et al. | |
| 2015/0160956 A1 | 6/2015 | Shah et al. | |
| 2015/0172760 A1* | 6/2015 | AbiEzzi | H04N 21/4437 725/39 |
| 2015/0333979 A1 | 11/2015 | Schwengler et al. | |
| 2016/0216988 A1 | 7/2016 | Oshins et al. | |
| 2016/0274929 A1 | 9/2016 | King | |
| 2017/0192813 A1 | 7/2017 | King | |

FOREIGN PATENT DOCUMENTS

| | | |
|---|---|---|
| CN | 102420846 | 4/2012 |
| CN | 102855138 | 1/2013 |
| CN | 103034453 | 4/2013 |
| CN | 103984589 | 8/2014 |
| JP | 11312190 | 11/1999 |
| JP | H06012347 | 1/2006 |
| JP | 2009217497 | 9/2009 |
| JP | 2010026706 | 2/2010 |
| JP | 2010122855 | 6/2010 |
| WO | WO2014116619 | 7/2014 |

OTHER PUBLICATIONS

Amazon, "Amazon Elastic Compute Cloud—User Guide—API Version Jun. 15, 2014", Aug. 23, 2014, pp. i-x, 1-6, 422-476, 675-687, retrieved from the internet at URL:http://wayback.archive.org/web/20140823223149/http:/awsdocs.s3.amazonaws.com/EC2/latest/ec2-ug.pdf on May 31, 2016.

The Australian Office Action dated Apr. 24, 2018 for Australian Patent Application No. 2016235759, a counterpart foreign application of U.S. Pat. No. 9,582,298, 3 pages.

The Canadian Office Action dated Jun. 26, 2018 for Canadian Patent Application No. 2978183, a counterpart foreign application of U.S. Pat. No. 9,582,298, 3 pages.

The European Office Action dated Aug. 8, 2018 for European patent application No. 16715657.9, a counterpart foreign application of U.S. Pat. No. 9,582,298, 7 pages.

Office action for U.S. Appl. No. 14/664,135, dated Aug. 15, 2017, King, "Executing Commands Within Virtual Machine Instances", 22 pages.

Office action for U.S. Appl. No. 14/664,135, dated Jan. 11, 2018, King, "Executing Commands Within Virtual Machine Instances", 18 pages.

Office action for U.S. Appl. No. 14/664,135, dated Feb. 19, 2016, King, "Executing Commands Within Virtual Machine Instances", 14 pages.

Office action for U.S. Appl. No. 14/664,135, dated Jul. 15, 2016, King, "Executing Commands Within Virtual Machine Instances", 17 pages.

PCT Search Report and Written Opinion dated Jun. 10, 2016 for PCT application No. PCT/US16/22686, 12 pages.

The Singapore Office Action dated Jan. 8, 2018 for Singapore patent application No. 11201706848V, a counterpart foreign application of U.S. Pat. No. 9,582,298, 6 pages.

Sun Microsystems, "The Sun Cloud API", The APIs for the Sun Cloud: Wiki: Home-Project Kenai, Apr. 10, 2014, retrieved from the internet at URL: https://kenai.com/projects/suncloudapis/pages/Home on May 30, 2016, pp. 1, 2, 6.

Sun Microsystems, "Hello Cloud—An Illustrative Walk-Through of the Sun Cloud API", The APIs for the Sun Cloud: Wiki: HelloCloud—Project Kenai, Aug. 19, 2009, retrieved from the internet at URL:https://kenai.com/projects/suncloudapis/pages/HelloCloud on May 30, 2016.

Kanzaki et al, "Truth of unknown mainframe, The final article: ensuring stable mainframe operability", Monthly ASCII. Technologies, vol. 16, No. 1, ASCII Media Works Inc., Japan, Nov. 24, 2010, p. 89.

Kurashiki et al, "Special Feature 2, Use Debian heavily, Chapter 3: Simple and convenient sandbox introduced using cowbuilder", Software Design, Serial No. 322, Gijutsu-Hyohron Co., Ltd., Japan, Feb. 18, 2012, pp. 72-73.

Kurozimi et al, "Guide to using Jakarta, The 25th article: how to use 'Apache FtpServer'" Java WORLD, vol. 9, No. 4, IDF Japan, 2005, p. 144.

Smith, "Secure PowerShell Remoting Using Constrained Endpoints", Published Feb. 11, 2015, Netwrix Blog, retreived from: <<https://blog.netwrix.com>>, 9 pages.

Sueyasu et al, "Special Feature 1, Specially selected free software recommended by the editorial department: ssh capable of limiting services offered by SSH to scp and sftp", Nikkei Linux, vol. 7, No. 1, Nikkei Budiness Publications, Japan, Jan. 5, 2005, p. 50.

VMware, "Running Custom Scripts in the Guest Operating System with Invoke VMScript", VMware vSphere PowerCLI 5.1 Release 1, Copyrigth 2009-2012, 3 pages.

VMware, "vSphere PowerCLI Reference Invoke—VMScript", Copyright 1998-2013 VMware, Inc., retreived on Jan. 21, 2019, 3 pages.

Yaguchi et al, "New services of AWS launched successively: strengthening log obtainment and disaster countermeasures and

(56) References Cited

OTHER PUBLICATIONS beginning to offer virtual desktop services", Nikkei Systems, ISSN 1881-1620, No. 249,Nikkei Business Publications, Inc., Japan, Dec. 26, 2013, pp. 12-13.

The Japanese Office Action dated Nov. 6, 2018 for Japanese Application No. 2017-547402, a counterpart foreign application of the U.S. Appl. No. 14/664,135, 22 pages.

The Canadian Office Action dated Jan. 30, 2020 for Canadian Patent Application No. 2,978,183, a counterpart of U.S. Pat. No. 9,582,298, 3 pages.

The Chinese Office Action dated Mar. 4, 2020 for Chinese Patent Application No. 201680014284.7, a counterpart of U.S. Pat. No. 9,582,298, 6 pages.

The Translated Chinese Office Action dated Mar. 4, 2020 for Chinese Patent Application No. 201680014284.7, a counterpart of U.S. Pat. No. 9,582,298, 4 pages.

\* cited by examiner

EXECUTING COMMANDS WITHIN VIRTUAL MACHINE INSTANCES

CROSS-REFERENCE TO RELATED APPLICATION(S)

This application is a continuation of, and claims priority to, U.S. patent application Ser. No. 15/443,697, filed Feb. 27, 2017, which is a continuation of U.S. patent application Ser. No. 14/664,135, filed Mar. 20, 2015, now U.S. Pat. No. 9,582,298, issued Feb. 28, 2017, which are incorporated herein by reference in their entirety.

BACKGROUND

Network-based service provider networks exist that allow customers to purchase and utilize various types of computing resources on a permanent or as-needed basis. For example, a service provider network may permit customers to purchase and utilize computing resources such as virtual machine ("VM") instances, data storage resources, database resources, networking resources, network services, and other types of computing resources. Customers may configure the computing resources provided by a service provider network to implement desired functionality, such as to provide a network-based application or another type of functionality.

Managing computing resources provided by a service provider network such as those described above can be complex and time consuming. For example, and without limitation, in order to execute commands within a VM instance, it may be necessary for users to remotely login to the VM instance in order to perform the desired command. This process can be very time consuming, especially where the command is to be executed in more than one VM instance.

The disclosure made herein is presented with respect to these and other considerations.

DETAILED DESCRIPTION

Figure 1:
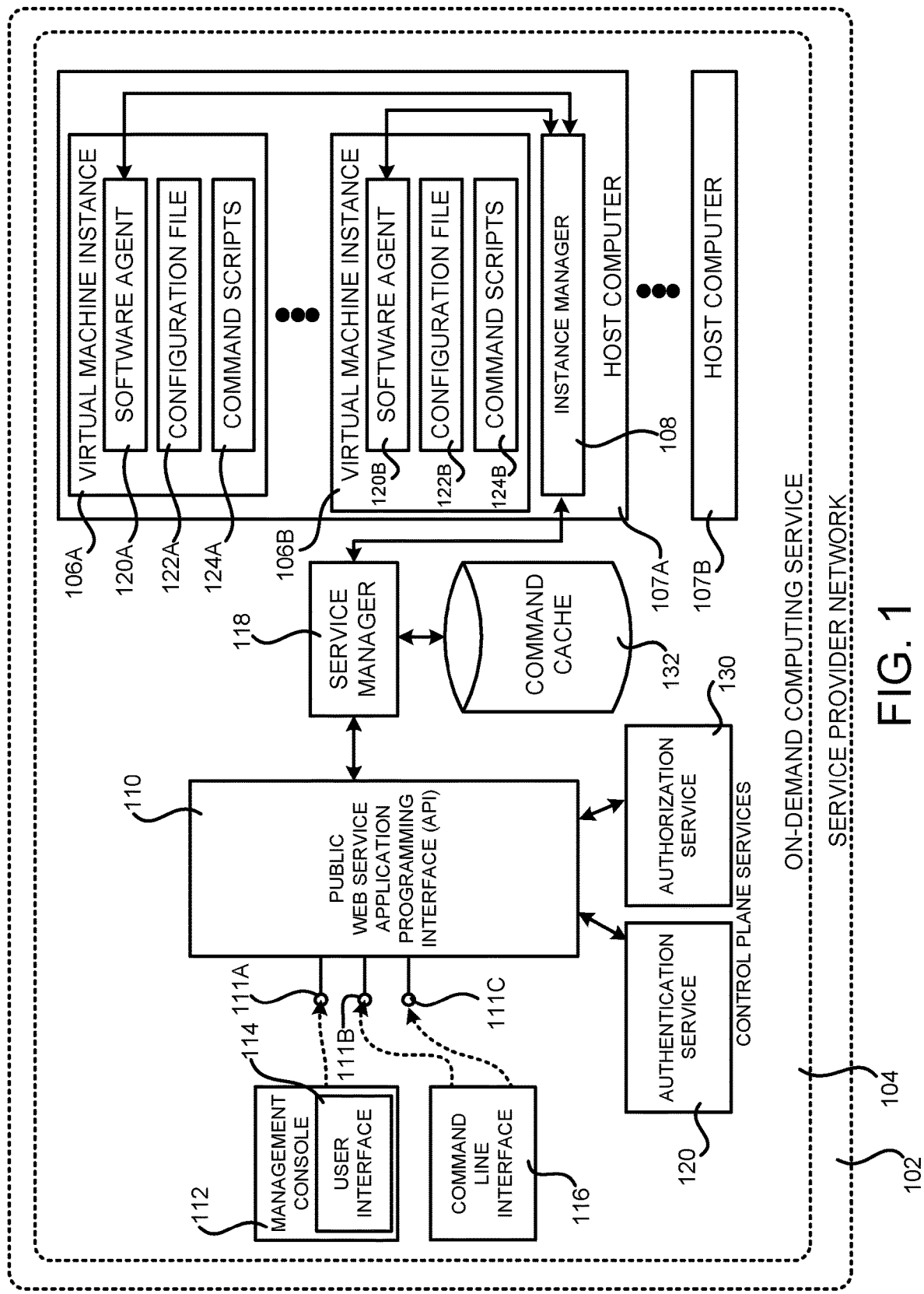
FIG. 1 is a system architecture diagram showing aspects of the configuration and operation of a service provider network that is configured to provide functionality for executing commands within VM instances.

The following detailed description is directed to technologies for executing commands within a VM instance. The disclosure presented herein also includes technologies for discovering the commands that can be executed within a VM instance and for obtaining information indicating the status of a command that is executing, or that has completed execution, within a VM instance. Through an implementation of these technologies, users of an on-demand computing service provided by a service provider network can quickly and easily execute commands within VM instances without having to remotely login to the VM instances.

As discussed briefly above, the various technologies disclosed herein may be implemented in a service provider network. A service provider network may permit customers to purchase and utilize computing resources (which may be referred to herein as "resources") such as VM instances, data storage resources, database resources, networking resources, network services, and other types of computing resources. In order to support the functionality disclosed herein, VM instances executing in the service provider network may be configured with a software agent, such as a daemon or other type of background process, that is configured to receive and respond to requests for data, such as a list, identifying the commands that can be executed in a particular instance, to execute a command, and to provide data indicating the status of the execution of a command. In order to perform these functions, a configuration file might also be maintained that identifies the available commands for an instance and that specifies a script or other type of program code for performing each of the commands. The configuration file and the scripts or other types of programs might be stored at the VM instance or in another location.

A public web service application programming interface ("API") might also be exposed within the service provider network in some configurations that provides methods relating to the execution of commands within a VM instance. For example, in one configuration the API includes a method for requesting data identifying the commands that may be executed within a VM instance. In response to receiving a call to the method for requesting data identifying the commands that can be executed within the VM instance, a request is transmitted to the software agent executing on the VM instance for the data identifying the commands that can be executed. An instance manager executing on the host computer executing the VM instance may receive the request and pass the request to the software agent in some configurations. In turn, the software agent is configured to return data identifying the commands that can be executed on the VM instance. The data may be utilized to populate a user interface ("UI") configured to display UI controls for executing the commands in response to user selection and/or in other ways.

In some configurations, calls may be made periodically to the method for requesting data identifying the commands that may be executed within a VM instance. The data identifying the commands may be received and stored in a cache. When calls are subsequently received to the method, the data stored in the cache may be utilized rather than making a request to the software agent on the VM instance. In this way, the data identifying the commands that can be executed in a VM instance can be obtained and returned in response to a request faster than if a call were to be made to the software agent executing in the VM instance.

The API also includes a method for executing commands within a VM instance. In response to a call to the method for executing a command within a VM instance, a request is transmitted to the software agent executing on the VM instance to execute the requested command. In turn, the software agent is configured to execute the identified command by performing the associated script or other type of program code. The software agent might also be configured to return a unique identifier ("ID") associated with the command in response to the request. As will be described in greater detail below, the ID may be utilized to obtain information describing the status of the execution of the command and/or the output of the execution of the command. In some configurations, various authentication and/or authorization processes may be performed to ensure that a user associated with a request is authorized to perform a requested command on a particular VM instance. Other types of security checks might also be made prior to executing a command within a VM instance.

In some configurations, the API also includes a method for obtaining data describing the status of the execution of a command within a VM instance. A call to this method may include the ID provided by the software agent at the time the request to execute the command was made. In response to receiving a call to this method, a request is transmitted to the software agent executing on the VM instance upon which the command was executed. The request may include the ID associated with the command. In response thereto, the software agent executing on the VM instance is configured to obtain and return data indicating the status of the execution of the command. For example, and without limitation, the data might indicate whether execution is in progress or has completed and, if completed, whether execution was successful or failed. The returned data might also include the output of the execution of the command in some configurations.

Using an implementation of the mechanisms described above, various types of commands can be executed within a VM instance without requiring a user to login to the VM instance. For example, and without limitation, commands can be executed for restarting a process on a VM instance, for flushing a cache, for performing a backup operation, for configuring the VM instance, and/or for performing a test on the VM instance. Other types of commands can also be executed. Additional details regarding the various components and processes described briefly above will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, such as a service provider network, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a service provider network 102 that is configured to provide functionality for executing commands within VM instances 106. The service provider network 102 is a distributed network through which customers and/or other users can utilize computing resources, such as VM instances 106 and/or other types of computing resources, on a permanent or as-needed basis.

Each type or configuration of a computing resource may be available from the service provider network 102 in different sizes. For example, a service provider might offer physical hosts, VM instances 106 or other types of data processing resources that are available for purchase and use that have many different configurations of processor capabilities, main memory, disk storage, and operating system. A service provider operating the service provider network 102 might also offer other types of resources for purchase and use by customers. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or services 106 on a permanent or as-needed basis. The resources might also include, but are not limited to, VM instances 106 and images, security groups, option groups, gateways, option sets, network access control lists ("ACLs"), subnets, storage buckets, network interfaces, snapshots, spot market requests, and storage volumes.

The service provider operating the service provider network 102 might also charge a fee for utilization of the resources to a customer that creates and uses the resources. The fee charged for a particular computing resource might be based upon the type and/or configuration of the computing resource. For example, in the case of a data processing computing resource, like a VM instance 106, the fee for use of the computing resource might be charged based upon the amount of time the computing resource is utilized. In the case of a data storage computing resource, the fee might be computed based upon the amount of data stored and/or the amount of data transferred into or out of the computing resource. The fees for other types of resources might also be based upon other considerations. A service provider might also utilize various purchasing models to determine the amount to charge a customer for use of resources provided by the service provider network 102.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The resources described briefly above might also be provisioned and de-provisioned as needed in an automated fashion. For example, the service provider network 102 might be configured to instantiate a new instance of a computing resource, such as a VM instance 106, in response to an increase in demand for a network service or other condition. Other types of computing resources might also be provisioned and de-provisioned in a similar manner. Services in the service provider network 102 might also provide functionality for automatically scaling and/or de-scaling resources based upon demand for the resources and/or other factors.

A customer or potential customer of the service provider network 102 might utilize an appropriate computing system (not shown in FIG. 1) to communicate with the service provider network 102 over an appropriate data communications network (also not shown in FIG. 1). In this way, a customer of the service provider network 102 can configure various aspects of the operation of the computing resources provided by the service provider network 102, or to otherwise control any computing resources being utilized by the customer. For example, and without limitation, a computing system utilized by a customer of the service provider network 102 might be utilized to purchase computing resources in the service provider network 102, to configure aspects of the operation of the computing resources through a management console 114 or other type of interface, to access and utilize functionality provided by the various services and systems described herein, and/or to perform other types of functionality with regard to the operation of the computing resources provided by the service provider network 102.

A customer computing system might be any type of computing device capable of connecting to the service provider network 102 via a suitable data communications network such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources provided by the service provider network 102 in a similar fashion.

As discussed briefly above, the service provider network 102 might also be configured to provide various types of network services for use internally and by customers. For example, and without limitation, the service provider network 102 may provide an on-demand computing service 104 for providing VM instances 106 on-demand, a data storage service for storing data, a cryptography service, a notification service, an authentication service, a policy management service, a task service and, potentially, other types of network-accessible services 106. These and other services and their associated resources may be utilized together to implement various types of network-based applications in the service provider network 102. Additional details regarding one implementation of the service provider network 102 and the various types of network services that might be provided by the service provider network 102 will be discussed below with regard to FIGS. 5-8.

As shown in FIG. 1 and discussed briefly above, an on-demand computing service 104 is utilized in some configurations to provide the VM instances 106. For instance, in the example shown in FIG. 1, the on-demand computing service 104 is providing two VM instances 106A and 106B that are executing on the same host computer 107A. In this regard, it should be appreciated that the configuration shown in FIG. 1 has been simplified for discussion purposes and that many other host computers 107 may be utilized to provide many other VM instances 106 in a similar fashion. For example, and without limitation, a host computer 107B might be utilized to provide additional VM instances 106. As discussed above, the VM instances 106 might also be provisioned and/or de-provisioned based upon demand and/or other factors.

As also shown in FIG. 1, the host computer 107A is configured with an instance manager 108 in some configurations. The instance manager 108 is a software component that executes external to the VM instances 106A and 106B. The instance manager 108 provides functionality for enabling communication with the VM instances 106A and 106B on a particular host computer 107A. More particularly, a software agent 120 is executed within each VM instance 106 in some configurations. For instance, in the example shown in FIG. 1, the VM instance 106A is executing the software agent 120A and the VM instance 106B is executing the software agent 120B. The software agent 120B might be implemented as a daemon or other type of background process that listens on an assigned port for communications from the instance manager 107. The software agent 120 might be implemented as another type of software component in other configurations.

A configuration file 122 and one or more command scripts 124 are also provisioned to each VM instance 106 in one configuration. For instance, in the example shown in FIG. 1, a configuration file 122A and command scripts 124A have been provisioned to the VM instance 106A and a configuration file 122B and command scripts 124B have been provisioned to the VM instance 106B. The configuration file 122 provides a list of the commands that can be executed within each VM instance 106. The configuration file 122 also identifies, for each command, a command script 124 that is to be executed when a request to execute the associated command is received by the software agent 120. In this regard, it should be appreciated that the commands might be implemented by other types of program code other than scripts. For example, and without limitation, the commands might be implemented by compiled program code, interpreted program code, and/or other types of program code in other configurations. It should also be appreciated that the list of commands set forth in the configuration file 122A can be edited by an authorized user to provide a custom list of commands that can be performed on a particular VM instance 106.

It should also be appreciated that the configuration file 122 and the command scripts 124 (or other types of program code) might be stored in a location other than within a VM instance 106 in other configurations. For example, and without limitation, the configuration file 122 and the command scripts 124 (or other types of program code) might be stored in a database or other type of network accessible location for use by the VM instances 106. Moreover, in some configurations a VM instance 106 may be configured to operate without the use of a configuration file 122. In these configurations, the command scripts 124 (or other type of program code) might be stored in a data store external to the VM instance 106. When a request to execute a command is received, the software agent 120 may retrieve the command script 124 (or other type of program code) to be executed from the data store without consulting the configuration file 122. Other implementations might also be utilized.

In order to instantiate VM instances 106 that include the software agent 120, the configuration file 122, and the command scripts 124 (or other type of program code), VM images may be created in advance that include these components. The VM images may then be utilized to instantiate VM instances 106 that are appropriately configured with the software components described above. The VM images might be created by an operator of the service provider network 102, a customer of the service provider network 102, a developer, and/or another entity.

As shown in FIG. 1, a public web service application programming interface ("API") 110 might also be exposed within the service provider network 102 in some configurations that provides methods 111 relating to the execution of commands within a VM instance 106. For example, in one configuration the API 110 includes a method 111A for requesting data identifying the commands that may be executed within a particular VM instance 106. Various components operating within the service provider network 102 may call the API 110. For example, and without limitation, a management console 112 may be utilized that provides a user interface ("UI") for managing the operation of the VM instances 106. The data identifying the commands that can be executed within a VM instance 106 may be utilized to generate UI controls within the UI 114 for executing the commands in response to user selection and/or in other ways. As shown in FIG. 1, the methods 111 exposed by the API 110 might be called by other components, such as through a command line interface ("CLI") 116 operating within the service provider network 102.

In response to receiving a call to the method 111A for requesting data identifying the commands that can be executed within the VM instance, a request is transmitted to the software agent 120 executing on the VM instance 106 for the data identifying the commands that can be executed. For example, and without limitation, in one configuration the API 110 transmits a request to a service manager 118. In turn, the service manager 118 transmits a request for the available commands to the instance manager 108 executing on the same host computer 107 as the VM instance 106 for which the list of commands is desired. The instance manager 108 receives the request and passes the request to the software agent 120 executing within the VM instance 106. In turn, the software agent 120 reads the available commands from the configuration file 122 and returns data identifying the available commands to the instance manager 108. The instance manager 108 returns the available commands to the service manager 118 which, in turn, returns the commands to the API 110. The data identifying the available commands may then be returned in response to the call to the method 111A, such as to the management console 112 or the CLI 116.

In some configurations, the service manager 118 or another component may be configured to periodically call to request the list of available commands from the VM instances 106 through the mechanism described above. The service manager 118 may receive the data identifying the commands and store the data in a cache, such as the command cache 132 illustrated in FIG. 1. When calls are subsequently received to the method 111A, the service manager 118 may return the data identifying the available commands that was previously stored in the cache rather than making a request to the software agent 120 on the VM instance 106. In this way, the data identifying the commands that can be executed in a VM instance 106 can be obtained and returned in response to a call to the method 111A faster than if a call were to be made to the software agent 120 executing in the VM instance 106. Other configurations might also be utilized in other implementations. Additional details regarding the operation of the method 111A will be provided below with regard to FIG. 2.

The API 110 also includes a method 111B for executing commands within a VM instance 120. In response to a call to the method 111B for executing a command within a VM instance 120, the API 110 transmits a request to the service manager 118 to execute the specified command on the identified VM instance 106. In turn, the service manager 118 transmits a request to the instance manager 108 executing on the host computer 107 executing the VM instance 106 in which the specified command is to be executed. In response thereto, the service manager 108 then transmits a request to the software agent 120 executing within the VM instance 106 in which the command is to be executed.

The software agent 120 receives the request to execute the command from the instance manager 108. In one configuration, the software agent 120 then examines the configuration file 122 to identify the command script 124 (or other type of program code) that corresponds to the requested command. Once the command script 124 associated with the requested command has been identified, the software agent 120 causes the command script 124A (or other type of program code for implementing the command) to be executed within the VM instance 106.

As discussed briefly above, the software agent 120 might also be configured to return a unique identifier ("ID") associated with the executed command in response to the request. For example, the software agent 120 might return the process ID for the executed command script 124A or other type of program code. Other types of IDs might also be utilized in other configurations. The ID is returned to the instance manager 108, which returns the ID to the service manager 118. The service manager 118 may then return the ID to the API which, in turn, returns the ID in response to the call to the method 111B. As will be described in greater detail below, the returned ID may be subsequently utilized to obtain information describing the status of the execution of the command and/or the output of the execution of the command.

In some configurations, various authentication and/or authorization processes may be performed to ensure that a user associated with a request to perform a command is authorized to perform the requested command on a particular VM instance 106. For example, and without limitation, the API 110 and/or the service manager 118 might call an authentication service 120 and/or an authorization service 130 prior to executing a command to verify that a user requesting execution of a command is authorized to perform the command. Through this authentication mechanism, users may be authorized to perform certain types of commands within a VM instance 106 even though the user may not be authorized to remotely login to the VM instance 106. In this regard, it should be appreciated that other types of security checks might also be made prior to executing a command within a VM instance 106. Additional details regarding the operation of the method 111B for executing a command within a VM instance 106 will be provided below with regard to FIG. 3.

In some configurations, the API 110 also includes a method 111C for obtaining data describing the status of the execution of a command within a VM instance 106. As discussed above, a call to the method 111C may include the ID provided by the software agent 120 at the time the request to execute the command was made. In response to receiving a call to this method, the API 110 transmits a request to the service manager 118 which, in turn, transmits a request to the appropriate instance manager 108. The instance manager 108 transmits a request for the status of the command to the software agent 120 executing on the VM instance 106 within which the command was executed. In response thereto, the software agent 120 executing within the VM instance 106 obtains and returns data indicating the status of the execution of the command. For example, and without limitation, the data might indicate whether execution is in progress or has completed and, if completed, whether execution was successful or failed. The returned data might also include the output of the execution of the command in some configurations. Additional details regarding the operation of the method 111C will be provided below with regard to FIG. 4.

As discussed briefly above, using an implementation of the mechanisms described above various types of commands can be executed within a VM instance 106 without requiring a user to login to the VM instance 106. For example, and without limitation, commands can be executed for restarting a process on a VM instance 106, for flushing a cache, for performing a backup operation, for configuring a VM instance 106, and/or for performing a test on a VM instance 106. Other types of commands can also be executed.

It should be appreciated that the various methods 111 described above as being exposed by the API 110 are merely illustrative and that other types of methods 111 might also or alternatively be provided in other configurations. It should also be appreciated that other services operating in the service provider network might also utilize the methods 111 exposed by the API 110. Services other than those shown in FIG. 1 that operate within the service provider network 102 might also be utilized to implement the functionality provided by the API 110.

Figure 2:
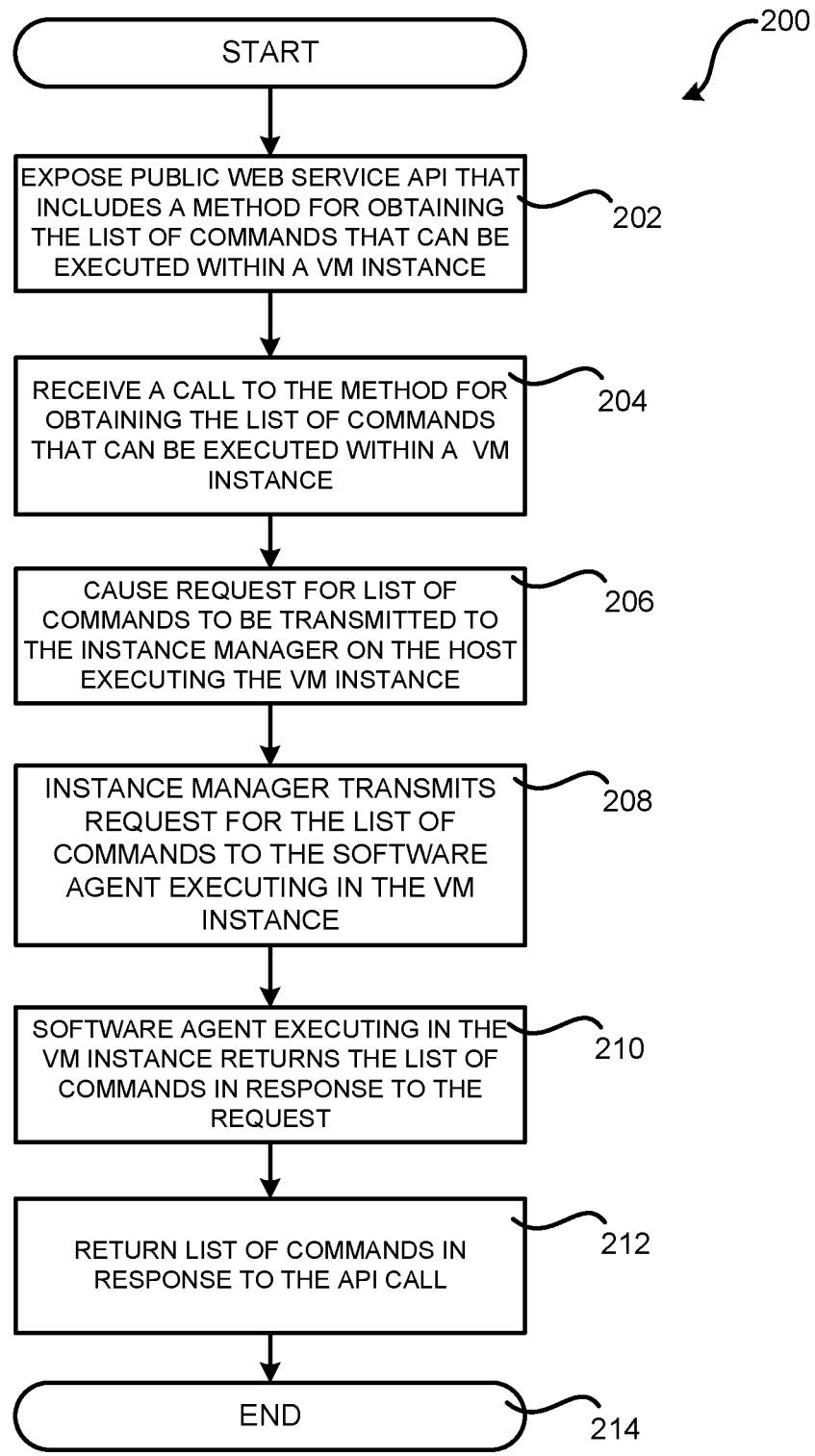
FIG. 2 is a flow diagram showing an illustrative routine for obtaining a list of commands that can be executed within a VM instance.

FIG. 2 is a flow diagram showing an illustrative routine 200 for obtaining data, such as a list, identifying the commands that can be executed within a particular VM instance 106. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the public web service API 110 is exposed within the service provider network 102. As discussed above, the API 110 includes a method 1102A for obtaining data, such as a list, that describes the commands that can be executed within a particular VM instance 106. From operation 202, the routine 200 proceeds to operation 204, where a call is received to the method 111A for obtaining data describing the commands that can be executed within a VM instance 106. For example, and without limitation, the management console 112 and the CLI 116 might be utilized in various configurations to make such a call to the method 111A. Other components might be utilized to make such a call in other configurations.

From operation 204, the routine 200 proceeds to operation 206, where the API 110 causes a request to be transmitted to the instance manager 108 on the host computer 107 executing the VM instance 120 for which the list of commands is to be obtained. As discussed above, the service manager 118 is called in some configurations which, in turn, calls the instance manager 108 on the appropriate host computer 107 for the list of commands. The instance manager 108 transmits the request for the available commands to the software agent 120 executing in the appropriate VM instance 106 at operation 208.

At operation 210, the software agent 106 receives the request for the available commands from the instance manager 108 and identifies the available commands based upon the contents of the configuration file 122 in one configuration. The software agent 106 then returns data identifying the commands available for execution to the instance manager 108. In turn, the instance manager 108 returns the available commands to the service manager 118, which returns the list of commands to the API 110. In turn, the list of commands is returned in response to the call to the method 111A at operation 212. The routine 200 then proceeds from operation 212 to operation 214, where it ends. As discussed above, other mechanisms, such as caching, might also be utilized to obtain and return the list of available commands more quickly in other configurations.

Figure 3:
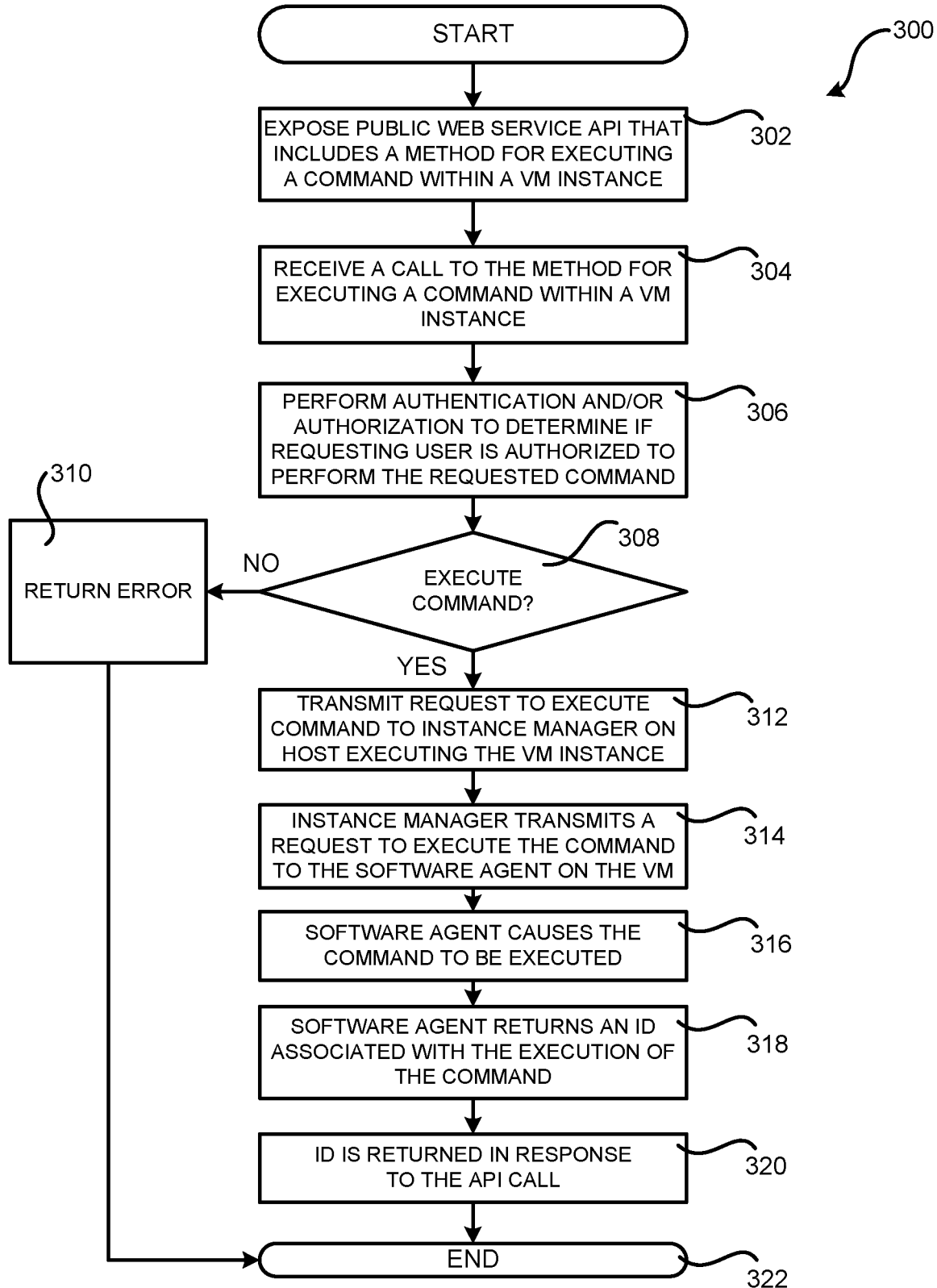
FIG. 3 is a flow diagram showing an illustrative routine for executing a command within a VM instance.

FIG. 3 is a flow diagram showing an illustrative routine 300 for executing a command within a VM instance 106. The routine 300 begins at operation 302, where the API 100 exposes a method 111B for executing a command within a VM instance 106 executing in the service provider network 102. From operation 302, the routine 300 proceeds to operation 304, where a call is received to the method 111B for executing a command within a VM instance 106. As discussed above, such a call might be made by the management console 112, the CLI 116, or another component.

From operation 304, the routine 300 proceeds to operation 306, where authentication and/or authorization might be performed in order to verify that a user associated with the request to execute the command is permitted to perform the command. For example, and without limitation, the API 110 might call the authentication service 120 and/or the authorization service 130 to determine whether the user is permitted to execute the command. If the user is not permitted to execute the command, the routine 300 may proceed from operation 308 to operation 310, where an error may be returned. If, however, the user is permitted to execute the command, the routine 300 may proceed from operation 308 to operation 312.

At operation 312, the API 100 may cause a request to execute the command to be transmitted to the instance manager 108 executing on the host computer 107 that is executing the VM instance 106 in which the command is to be executed. In turn, the instance manager 108 transmits a request to execute the command to the appropriate software agent 120 executing in the VM instance 106 at operation 314. The software agent 120 utilizes the configuration file 122 to identify the command script 124 (or other program component) corresponding to the requested command at operation 318. The software agent 120 then executes the identified command script 124 (or other program component).

From operation 316, the routine 300 proceeds to operation 318, where the software agent 120 returns the ID associated with the execution of the command to the instance manager 108. The instance manager 108 returns the ID to the service manager 118 which, in turn, returns the ID to the API 110. The ID can then be returned in response to the call to the method 111B at operation 320. The routine 300 then proceeds from operation 320 to operation 322, where it ends.

It should be appreciated that, in some configurations, the execution of commands and/or the results of execution may be logged by the software agent 120, the instance manager 108, the API 110, and/or the service manager 118. In this way, a record can be kept of the commands that were executed on each VM instance 106 and, potentially, the results of execution. Other data regarding the calls to the API 110 and/or the execution of commands on the VM instances 106 might also be captured and maintained in other configurations.

Figure 4:
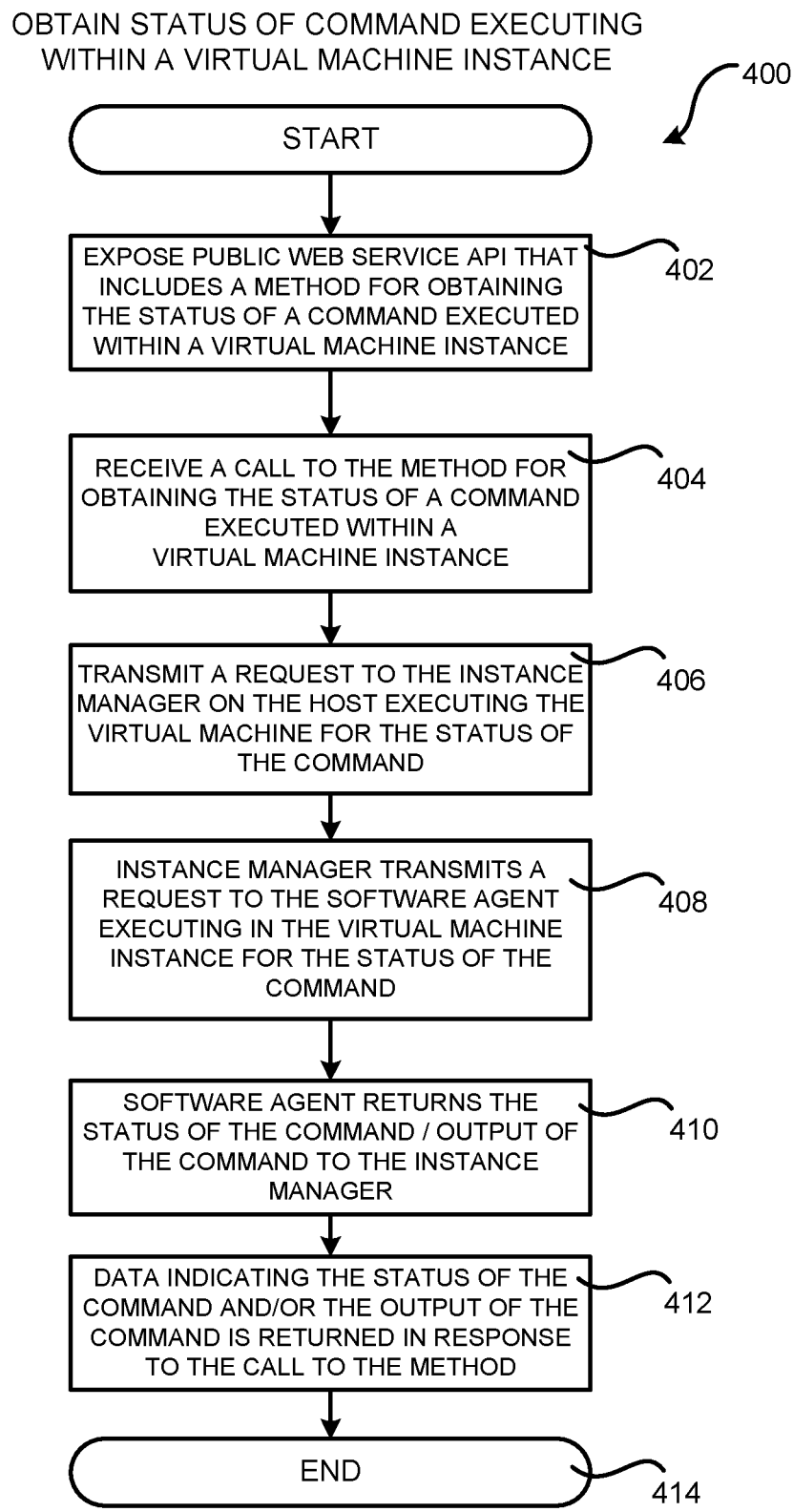
FIG. 4 is a flow diagram showing aspects of an illustrative routine disclosed herein for obtaining the status of a command executing, or that has completed execution, within a VM instance.

FIG. 4 is a flow diagram showing aspects of an illustrative routine 400 disclosed herein for obtaining the status of a command executing, or that has completed execution, within a VM instance 106. The routine 400 begins at operation 402, where the API 110 exposes a method 111C for obtaining the status of a command that has been executed within a VM instance 106. From operation 402, the routine 400 proceeds to operation 404, where a call is received to the method 111C to obtain the status of a command executed within a VM instance 106. As discussed above, the management console 112, the CLI 116, and/or another component may make such a call. Additionally, the call may include the ID that was returned by the software agent 120 when the command was executed.

From operation 404, the routine 400 proceeds to operation 406, where a request is transmitted via the service manager 118 to the instance manager 108 executing on the host computer 107 containing the VM instance 106 within which the command was executed. The routine 400 then proceeds from operation 406 to operation 408, where the instance manger 108 transmits a request for the status of the execution of the command to the software agent 120 in the VM instance 106 in which the command was executed. The routine 400 then proceeds to operation 410, where the software agent 120 returns the status of the execution of the command to the instance manger 108. The status might indicate, for example, that execution of the command was successful or that execution failed. The status might also or alternately indicate other types of conditions. The status might also include a text output of the execution of the command. The output of the execution of the command might be presented in the UI 114, the CLI 116, and/or in another manner.

From operation 410, the instance manager 108 returns the data indicating the status of the execution of the command to the service manager 118. The service manager 118, in turn, returns the data to the API 110, which returns the data in response to the call to the method 111C. From operation 412, the routine 400 proceeds to operation 414, where it ends.

Figure 5:
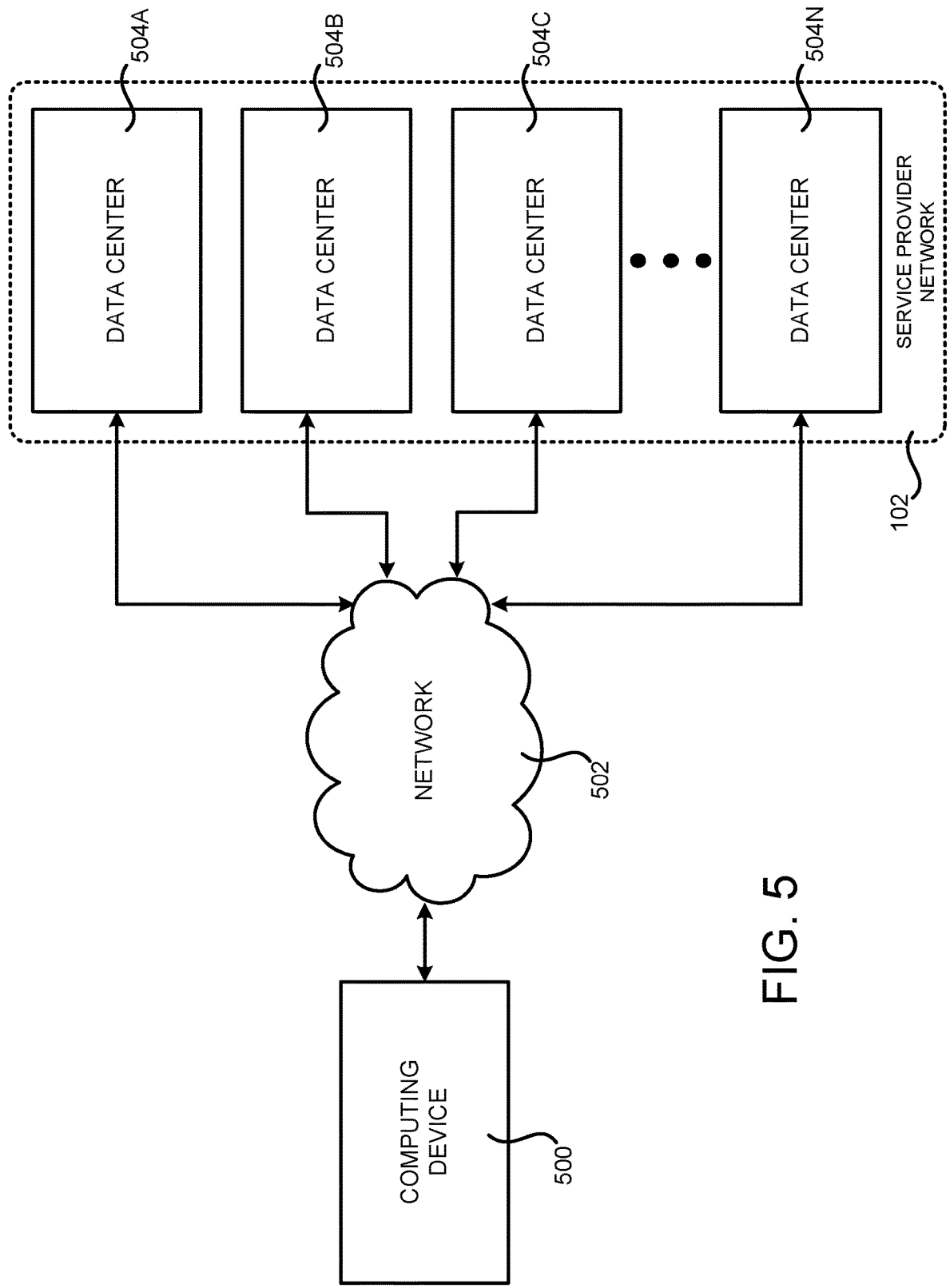
FIG. 5 is a system and network diagram that shows an illustrative operating environment that includes a service provider network that may be configured to implement aspects of the functionality described herein.

FIG. 5 is a system and network diagram that shows one illustrative operating environment for the configurations disclosed herein that includes a service provider network 102 that may be configured to provide functionality for performing commands within VM instances 106 and related functionality in the manner described above, according to one configuration disclosed herein. As discussed above, the service provider network 102 can provide computing resources, like VM instances 106, on a permanent or an as-needed basis. Among other types of functionality, the computing resources provided by the service provider network 102 can be utilized to implement the various services described above. As also discussed above, the computing resources provided by the service provider network 102 may include various types of computing resources, such as data processing resources like VM instances 106, data storage resources, networking resources, data communication resources, network services, and the like.

Each type of computing resource provided by the service provider network 102 may be general-purpose or may be available in a number of specific configurations. For example, data processing resources may be available as physical computers or VM instances 106 in a number of different configurations. The VM instances 106 may be configured to execute applications, including web servers, application servers, media servers, database servers, some or all of the services described above, and/or other types of programs. Data storage resources may include file storage devices, block storage devices, and the like. The service provider network 102 might also be configured to provide other types of computing resources not mentioned specifically herein.

The computing resources provided by the service provider network 102 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that might be utilized to implement the technologies disclosed herein will be described below with regard to FIG. 6.

The customers and other users of the service provider network 102 may access the computing resources provided by the service provider network 102 over a network 502, which may be a wide area communication network ("WAN"), such as the Internet, an intranet or an Internet service provider ("ISP") network or a combination of such networks. For example, and without limitation, a computing device 500 operated by a customer or other user of the service provider network 102 might be utilized to access the service provider network 102 by way of the network 502. It should be appreciated that a local-area network ("LAN"), the Internet, or any other networking topology known in the art that connects the data centers 504 to remote customers and other users may be utilized. It should also be appreciated that combinations of such networks might also be utilized.

Figure 6:
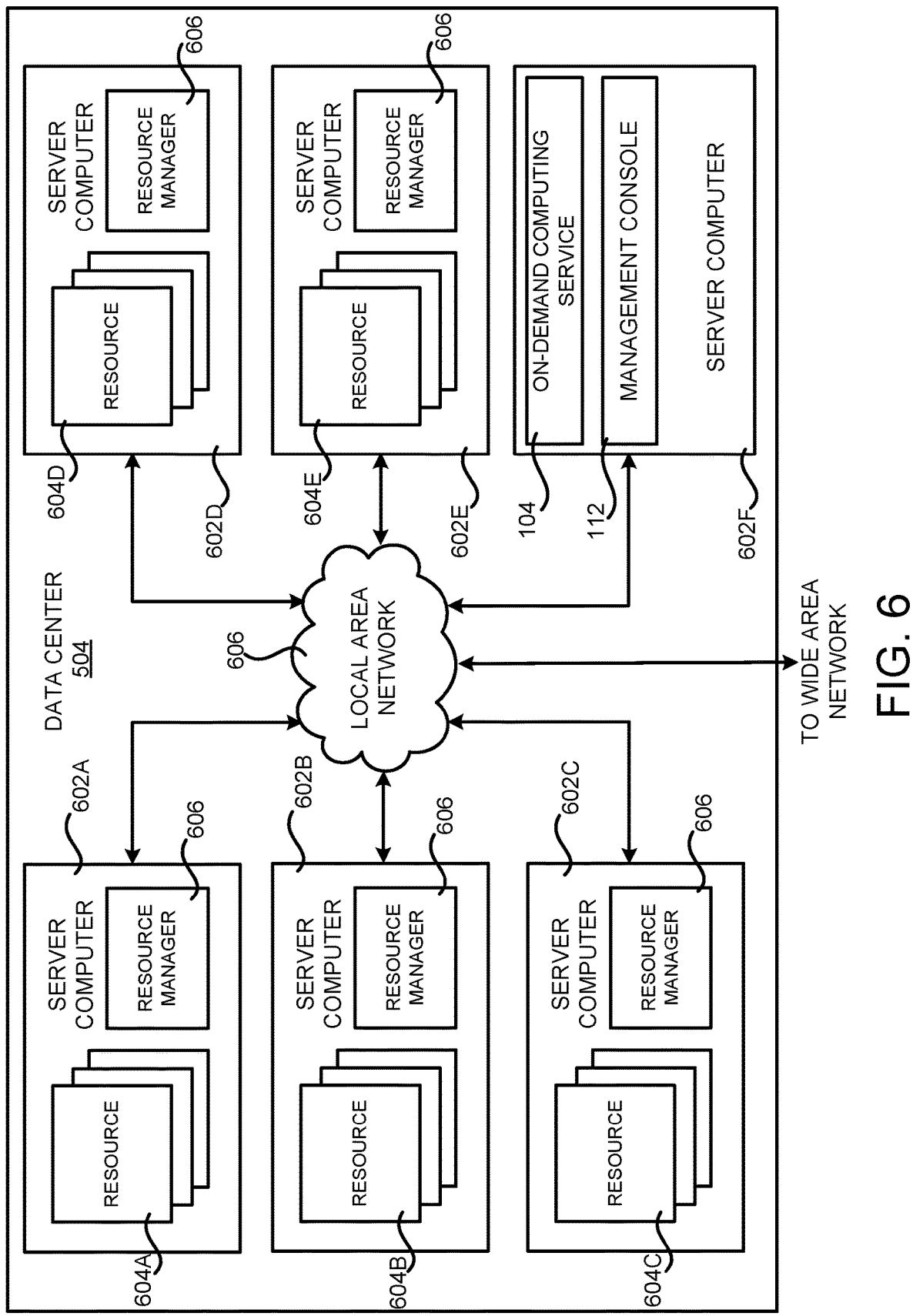
FIG. 6 is a computing system diagram illustrating a configuration for a data center that may be utilized to implement aspects of the technologies disclosed herein.

FIG. 6 is a computing system diagram that illustrates one configuration for a data center 504 that implements aspects of the technologies disclosed herein for executing commands within VM instances 106 and the related functionality disclosed herein. The example data center 504 shown in FIG. 6 includes several server computers 602A-602F (which may be referred to herein singularly as "a server computer 602" or in the plural as "the server computers 602") for providing computing resources 606A-606E.

The server computers 602 may be standard tower, rackmount, or blade server computers configured appropriately for providing the computing resources described herein (illustrated in FIG. 6 as the computing resources 604A-604E). As mentioned above, the computing resources provided by the service provider network 102 might be data processing resources such as VM instances 106 or hardware computing systems, data storage resources, database resources, networking resources, and others. Some of the servers 602 might also be configured to execute a resource manager 604 capable of instantiating and/or managing the computing resources. In the case of VM instances 106, for example, the resource manager 604 might be a hypervisor or another type of program configured to enable the execution of multiple VM instances 106 on a single server 602. Server computers 602 in the data center 504 might also be configured to provide network services and other types of services, some of which are described in detail below with regard to FIG. 7.

The data center 504 shown in FIG. 6 also includes a server computer 602F that may execute some or all of the software components described above. For example, and without limitation, the server computer 602F might be configured to execute various components for providing the on-demand computing service 104, the management console 112, and/or the other software components described above. The server computer 602F might also be configured to execute other components and/or to store data for providing some or all of the functionality described herein. In this regard, it should be appreciated that the services illustrated in FIG. 6 as executing on the server computer 602F might execute on many other physical or virtual servers in the data centers 504 in various configurations.

In the example data center 504 shown in FIG. 6, an appropriate LAN 606 is also utilized to interconnect the server computers 602A-602F. The LAN 606 is also connected to the network 502 illustrated in FIG. 5. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with reference to FIG. 6 is merely illustrative and that other implementations might be utilized.

Figure 7:
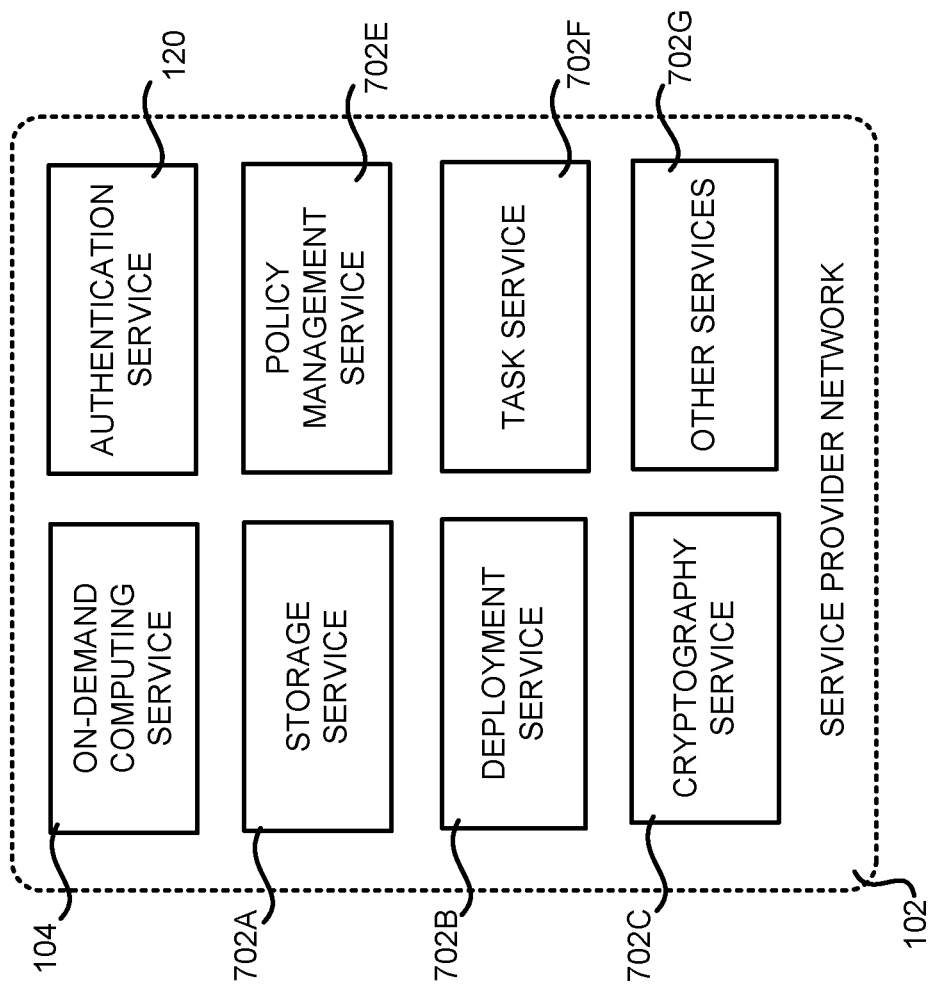
FIG. 7 is a system and network diagram that shows aspects of several services that might be provided by and utilized within a service provider network in one configuration disclosed herein.

FIG. 7 is a system and network diagram that shows aspects of several network services that might be provided by and utilized within a service provider network 102 in one configuration disclosed herein. In particular, and as discussed above, the service provider network 102 may provide a variety of network services to customers and other users of the service provider network 102 including, but not limited to, the on-demand computing service 104. The service provider network 102 might also provide other types of services including, but not limited to, a storage service 702A, a deployment service 702B, a cryptography service 702C, an authentication service 120, a policy management service 702E, and/or a task service 702F, each of which is described in greater detail below. Additionally, the service provider network 102 might also provide other services 702G, some of which are described in greater detail below.

It should be appreciated that customers of the service provider network 102 may include organizations or individuals that utilize some or all of the services provided by the service provider network 102. As described above, a customer or other user may communicate with the service provider network 102 through a network, such as the network 502 shown in FIG. 5. Communications from a customer computing device, such as the computing device 500 shown in FIG. 5, to the service provider network 102 may cause the services provided by the service provider network 102 to operate in accordance with the described configurations or variations thereof.

It is noted that not all configurations described include the services described with reference to FIG. 7 and that additional services may be provided in addition to or as an alternative to services explicitly described. Each of the services shown in FIG. 7 might also expose web service interfaces that enable a caller to submit appropriately configured API calls to the various services through web service requests. In addition, each of the services may include service interfaces that enable the services to access each other (e.g., to enable a virtual computer system provided by the on-demand computing service 104 to store data in or retrieve data from the data storage service 702A). Additional details regarding some of the services shown in FIG. 7 will now be provided.

As discussed above, the on-demand computing service 104 may be a collection of computing resources configured to instantiate VM instances 106 and to provide other types of computing resources on demand. For example, a customer or other user of the service provider network 102 may interact with the on-demand computing service 104 (via appropriately configured and authenticated API calls) to provision and operate VM instances 106 that are instantiated on physical computing devices hosted and operated by the service provider network 102. The VM instances 106 may be used for various purposes, such as to operate as servers supporting a web site, to operate business applications or, generally, to serve as computing resources for the customer. Other applications for the VM instances 106 may be to support database applications, electronic commerce applications, business applications and/or other applications. Although the on-demand computing service 104 is shown in FIG. 7, any other computer system or computer system service may be utilized in the service provider network 102, such as a computer system or computer system service that does not employ virtualization and instead provisions computing resources on dedicated or shared computers/servers and/or other physical devices.

The storage service 702A might include software and computing resources that collectively operate to store data using block or file-level storage devices (and/or virtualizations thereof). The storage devices of the storage service 702A might, for instance, be operationally attached to virtual computer systems provided by the on-demand computing service 104 to serve as logical units (e.g., virtual drives) for the computer systems. A storage device might also enable the persistent storage of data used/generated by a corresponding virtual computer system where the virtual computer system service might only provide ephemeral data storage.

The service provider network 102 may also include a cryptography service 702C. The cryptography service 702C may utilize storage services of the service provider network 102, such as the storage service 702A, to store encryption keys in encrypted form, whereby the keys may be usable to decrypt customer keys accessible only to particular devices of the cryptography service 702C. The cryptography service 702C might also provide other types of functionality not specifically mentioned herein.

As illustrated in FIG. 7, the service provider network 102, in various configurations, also includes an authentication service 120 and a policy management service 702E. The authentication service 120, in one example, is a computer system (i.e., collection of computing resources) configured to perform operations involved in authentication of users. For instance, one of the services 702 shown in FIG. 7 may provide information from a user to the authentication service 120 to receive information in return that indicates whether or not the requests submitted by the user are authentic.

The policy management service 702E, in one example, is a network service configured to manage policies on behalf of customers or internal users of the service provider network 102. The policy management service 702E may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 702F. The task service 702F is configured to receive a task package and to enable executing tasks as dictated by the task package. The task service 702F may be configured to use any resource of the service provider network 102, such as instantiated virtual machines or virtual hosts, for executing the task. The task service 702F may configure the instantiated virtual machines or virtual hosts to operate using a selected operating system and/or a selected execution application in accordance with specified requirements.

The service provider network 102 may additionally maintain other services 702G based, at least in part, on the needs of its customers. For instance, the service provider network 102 may maintain a deployment service 702B for deploying program code and/or a database service (not shown in FIG. 7) in some configurations. A database service may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. Other services include object-level archival data storage services, and services that manage, monitor, interact with, or support other services. The service provider network 102 might also be configured with other services not specifically mentioned herein in other configurations.

Figure 8:
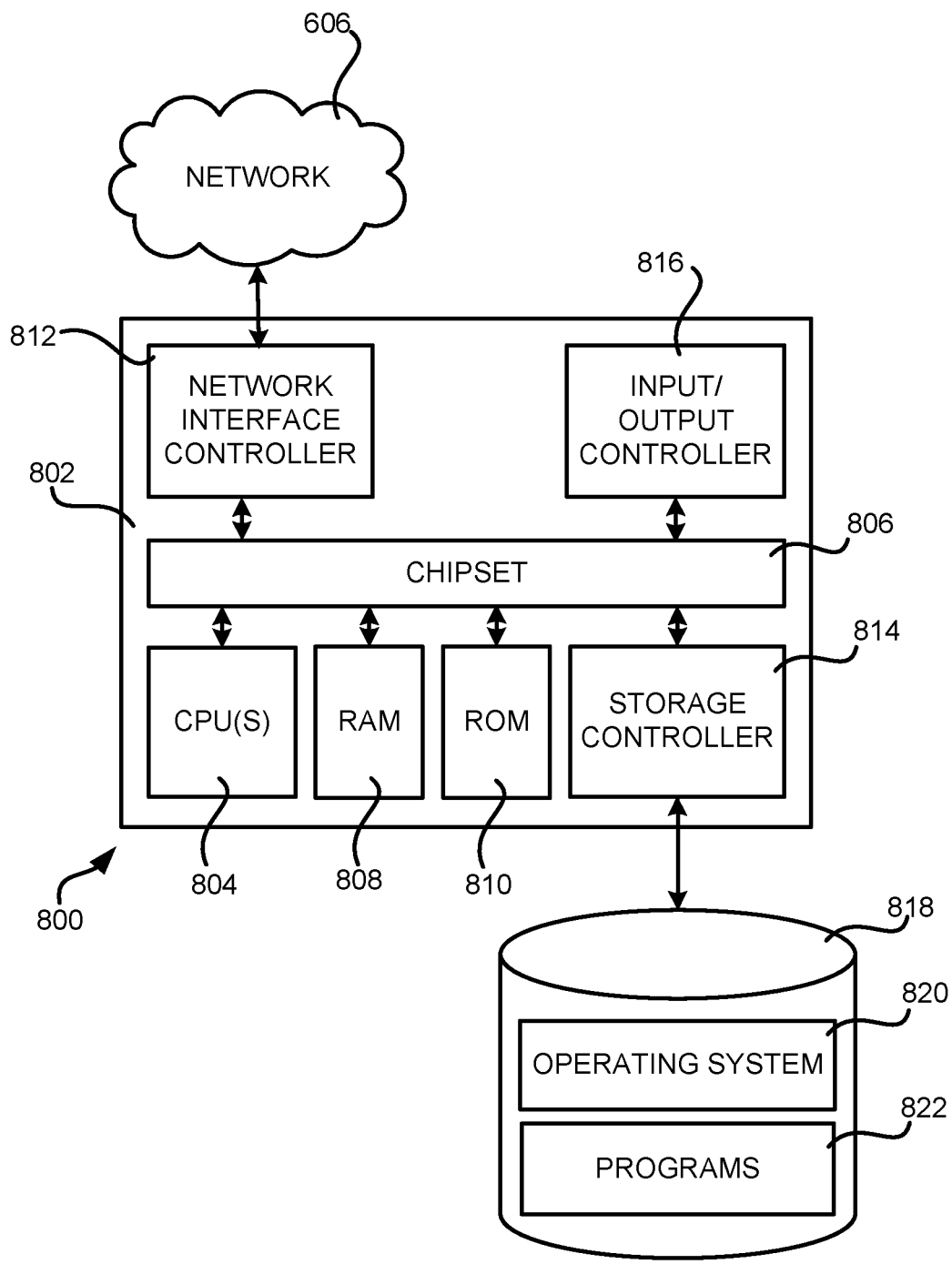
FIG. 8 is a computer architecture diagram showing an illustrative computer hardware architecture for implementing a computing device that might be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and may be utilized to execute any of the software components presented herein.

The computer 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the network 606. The chipset 806 may include functionality for providing network connectivity through a NIC 812, such as a gigabit Ethernet adapter. The NIC 812 is capable of connecting the computer 800 to other computing devices over the network 606. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store an operating system 820, programs 822, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 may store an operating system 820 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 818 may store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 2-4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for executing commands within VM instances have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. An apparatus, comprising:
   a processor; and
   a non-transitory computer-readable storage medium having instructions stored thereupon which are executable by the processor and which, when executed, cause the processor to:
      expose a public web service application programming interface (API) comprising a method configured to execute a specified command within a virtual machine (VM) instance;
      receive a call over the API to execute the specified command; and
      cause a request to execute a script associated with the specified command to be transmitted to a software component, the software component executing within the VM instance and configured to execute the script within the VM instance.

2. The apparatus of claim 1, wherein the software component is further configured to identify the script associated with the specified command using a configuration file.

3. The apparatus of claim 1, wherein the software component is further configured to retrieve the script associated with the specified command from a data store.

4. The apparatus of claim 1, wherein the non-transitory computer-readable storage medium has further instructions stored thereupon which, when executed, cause the processor to log execution of the script associated with the specified command.

5. The apparatus of claim 1, wherein the non-transitory computer-readable storage medium has further instructions stored thereupon which, when executed, cause the processor to utilize data identifying commands available for execution within the VM instance to generate a user interface (UI) configured to display a UI control for selecting the specified command.

6. The apparatus of claim 5, wherein receive the call over the API to execute the specified command is in response to a selection of the UI control for executing the specified command.

7. The apparatus of claim 1, wherein the non-transitory computer-readable storage medium has further instructions stored thereupon which, when executed, cause the processor to determine whether a user associated with the call over the API to execute the specified command is authorized to perform the specified command prior to causing the request to execute the script associated with the specified command to be transmitted to the software component executing in the VM instance.

8. A computer-implemented method for executing a command within a virtual machine (VM) instance executing within a service provider network, the computer-implemented method comprising:
 exposing an application programming interface (API) within the service provider network, the API comprising a method configured to execute a specified command within the VM instance;
 receiving a call over the API to execute the specified command; and
 causing a request to execute a script associated with the specified command to be transmitted to a software component, the software component executing within the VM instance and configured to execute the script within the VM instance.

9. The computer-implemented method of claim 8, wherein the software component is further configured to identify the script associated with the specified command using a configuration file.

10. The computer-implemented method of claim 8, wherein the software component is further configured to retrieve the script associated with the specified command from a data store.

11. The computer-implemented method of claim 8, further comprising:
 logging execution of the script associated with the specified command.

12. The computer-implemented method of claim 8, further comprising:
 utilizing data identifying commands available for execution within the VM instance to generate a user interface (UI) configured to display a UI control for selecting the specified command.

13. The computer-implemented method of claim 12, wherein receiving the call over the API to execute the specified command is in response to a selection of the UI control for executing the specified command.

14. The computer-implemented method of claim 8, further comprising:
 determining whether a user associated with the call over the API to execute the specified command is authorized to perform the specified command prior to causing the request to execute the script associated with the specified command to be transmitted to the software component executing in the VM instance.

15. A non-transitory computer-readable storage medium having computer-executable instructions stored thereupon which, when executed by a computer, cause the computer to:
 expose a public web service application programming interface (API) comprising a method configured to execute a specified command within a virtual machine (VM) instance;
 receive a call over the API to execute the specified command; and
 cause a request to execute a script associated with the specified command to be transmitted to a software component, the software component executing within the VM instance and configured to execute the script within the VM instance.

16. The non-transitory computer-readable storage medium of claim 15, wherein the software component is further configured to identify the script associated with the specified command using a configuration file.

17. The non-transitory computer-readable storage medium of claim 15, wherein the software component is further configured to retrieve the script associated with the specified command from a data store.

18. The non-transitory computer-readable storage medium of claim 15, wherein the non-transitory computer-readable storage medium has further instructions stored thereupon which, when executed, cause the computer to log execution of the script associated with the specified command.

19. The non-transitory computer-readable storage medium of claim 15, wherein the non-transitory computer-readable storage medium has further instructions stored thereupon which, when executed, cause the processor to utilize data identifying commands available for execution within the VM instance to generate a user interface (UI) configured to display a UI control for selecting the specified command.

20. The non-transitory computer-readable storage medium of claim 19, wherein receive the call over the API to execute the specified command is in response to a selection of the UI control for executing the specified command.

* * * * *